United States Patent
Mathur et al.

(10) Patent No.: US 11,163,586 B1
(45) Date of Patent: Nov. 2, 2021

(54) AUTOMATED CONFIGURATION OF APPLICATION PROGRAM INSTANCE

(71) Applicant: Xactly Corporation, San Jose, CA (US)

(72) Inventors: Nitin Mathur, Cupertino, CA (US); Krishna Bihari Kumar, Peoria, AZ (US); Amitoz Singh Ralhan, Cochrane (CA)

(73) Assignee: Xactly Corporation, San Jose, CA (US)

( * ) Notice: Subject to any disclaimer, the term of this patent is extended or adjusted under 35 U.S.C. 154(b) by 16 days.

(21) Appl. No.: 17/183,026

(22) Filed: Feb. 23, 2021

(51) Int. Cl.
*G06F 9/445* (2018.01)
*G06K 9/62* (2006.01)
*G06F 9/30* (2018.01)
*G06F 9/38* (2018.01)

(52) U.S. Cl.
CPC ........ *G06F 9/44505* (2013.01); *G06F 9/3005* (2013.01); *G06F 9/3836* (2013.01); *G06K 9/6259* (2013.01)

(58) Field of Classification Search
CPC .. G06F 9/44505; G06F 9/3005; G06F 9/3836; G06K 9/6259
See application file for complete search history.

(56) References Cited

U.S. PATENT DOCUMENTS

| | | | |
|---|---|---|---|
| 7,587,713 B1 * | 9/2009 | Barrett | G06F 9/451 717/168 |
| 8,464,244 B2 * | 6/2013 | Stern | G06F 9/44505 717/174 |

(Continued)

*Primary Examiner* — Farley Abad
(74) *Attorney, Agent, or Firm* — Baker Botts L.L.P.

(57) ABSTRACT

A computer-implemented method comprises, using a server computer that is communicatively coupled to an instance of an application program, and under stored program control: collecting answer data from a computing device by executing input AI instructions, to programmatically select a plurality of question data representing questions about configuration values of the application program, to cause rendering the question data in a user interface of a display device coupled to the computing device, and to select other question data automatically via a decision tree embodied in the input AI instructions; receiving a plurality of answer data from the computing device in response to the rendering of the question data; automatically repeating executing the input AI instructions and receiving the plurality of answer data to obtain a complete set of answer data; based on applying pre-defined programmatic rules to the answer data, identifying a plurality of contextually relevant domain objects and storing the domain objects; applying one or more programmed transformations to the domain objects to result in automatically generating one or more configuration files for the instance of the application program, the configuration files being formatted for machine parsing at the instance of the application program to cause automatic modification of one or more configuration parameters of the instance of the application program; uploading the one or more configuration files to the instance of the application program to cause the modification.

16 Claims, 8 Drawing Sheets

(56) References Cited

U.S. PATENT DOCUMENTS

| | | | |
|---|---|---|---|
| 8,781,845 B1* | 7/2014 | Burg | G06Q 10/06 705/1.1 |
| 2009/0089407 A1* | 4/2009 | Chalupa | G06F 15/16 709/220 |
| 2014/0324521 A1* | 10/2014 | Mun | G06Q 10/04 705/7.28 |
| 2019/0018557 A1* | 1/2019 | O'Driscoll | H04L 67/22 |
| 2019/0220529 A1* | 7/2019 | Eberlein | G06F 8/71 |
| 2019/0238403 A1* | 8/2019 | Wang | H04L 41/0806 |
| 2020/0379742 A1* | 12/2020 | Saluja | G06F 9/45558 |

* cited by examiner

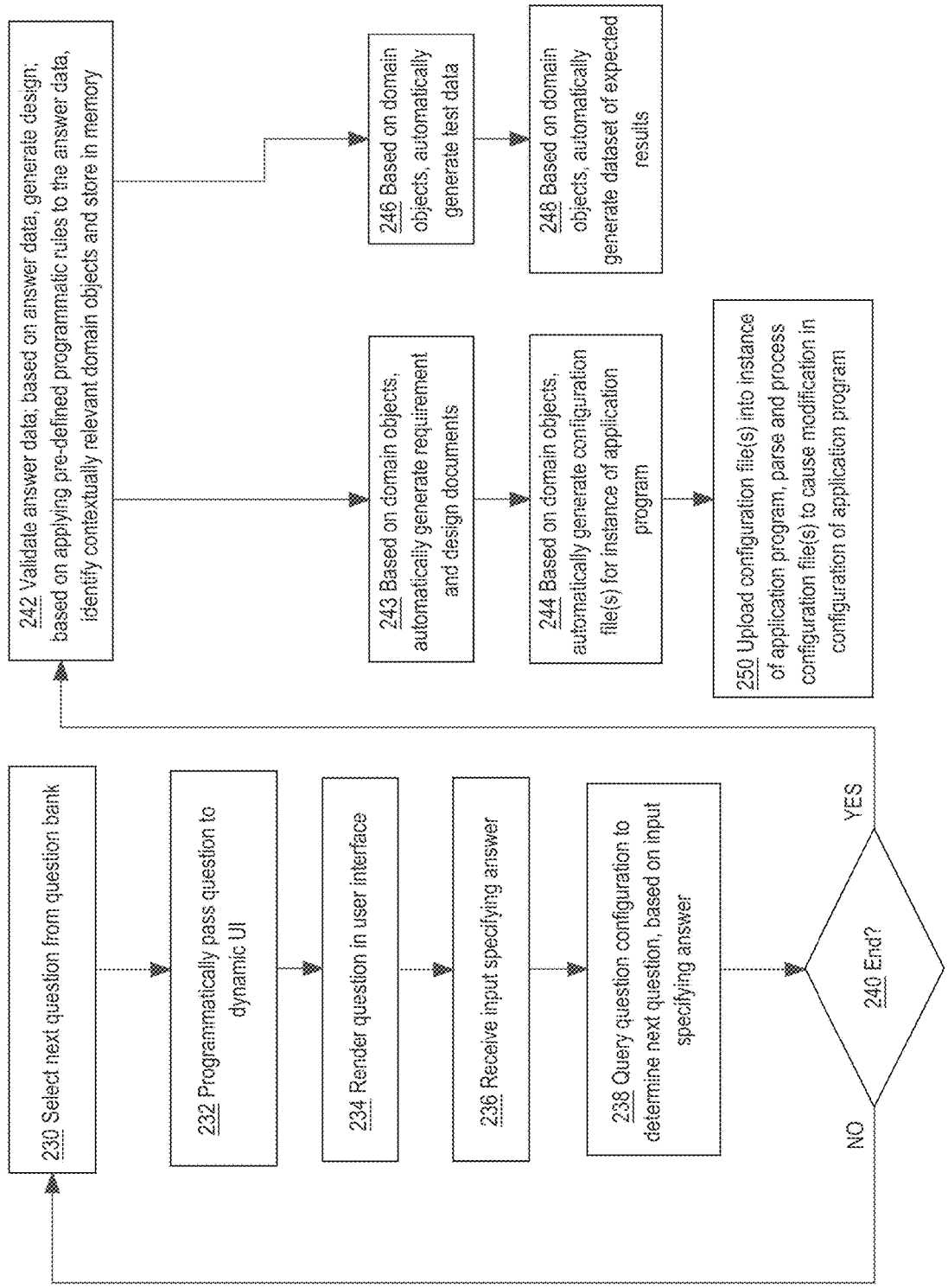

Fig. 3

4.1.2 Commissions: Software Incentive — 502
Commissions are calculated Monthly.
Each credit with a Credit Type of Software Incentive will be multiplied by a fixed flat rate.
A fixed flat rate of 100% will be used to the generate commissions.

| Commission Rate (%) |
|---|
| 100 |

<TODO> Generated Requirement & Design Document
Per Credit Commission Calculation Examples
Employee 00000170421 has YTD prior Software Incentive Units of 54 QUANTITY — 504
and Monthly of 55 QUANTITY.

| Order Code | Item Code | Credit Type | Credit Amount | YTD Software Incentive Units Credit Amount | Rate Table Tier and New Equipment Units Booked Multiplier | TSP Multiplier | Cash Coverage Multiplier | Compass Multiplier | Commission 506 |
|---|---|---|---|---|---|---|---|---|---|
| FN69511 | 641306_ Software Incentive | Software Incentive Units | $41,647.20 USD 1.00 QUANTITY | 55 QTY | Tier 1: 0.0050 0.0050x1.00 for the Software Incentive Units multiplier | Actual Sales 69,412 / Target Price 73,161.46 = 0.9488 and a 0.75 multiplier | Cash Coverage Initial = 106% and a 1.10 multiplier | Compass = N and a 1.00 multiplier | $41,647.20 *0.0050 *1.00 *0.75 *1.10 *1.00 = 171.79 |
| FN67474 | 643312_ Software Incentive | Software Incentive Units | $109,263.20 USD 1.00 QUANTITY | 56 QTY | Tier 2: 0.0060 0.0050x1.20 for the Software Incentive Units multiplier | Actual Sales 136,579 / Target Price 130,944.04 = 1.0430 and a 1.30 multiplier | Cash Coverage Initial = 106% and a 1.10 multiplier | Compass = N and a 1.00 multiplier | $109,263.20 *0.0050 *1.00 *0.75 *1.10 *1.00 = 937.48 |

4.2 COMPONENT 02: Hardware Incentive <TODO>
No component information found.
4.2.1 Credits: NA <TODO>
No credit information found.

FIG. 5

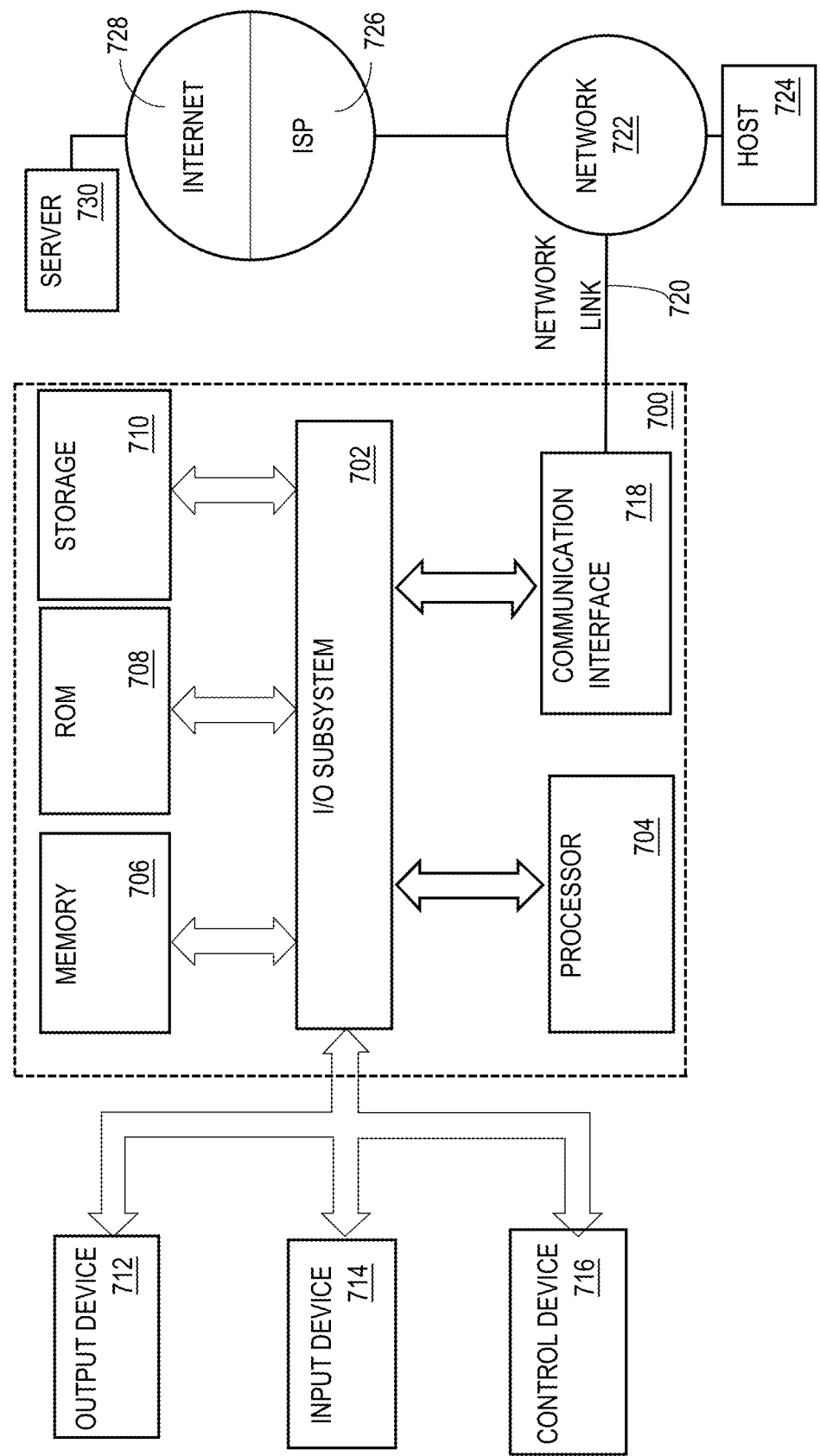

AUTOMATED CONFIGURATION OF APPLICATION PROGRAM INSTANCE

TECHNICAL FIELD

One technical field of the present disclosure is complex multi-tenant software-as-a-service (SaaS) application programs and systems. Another technical field is automated systems configuration. Yet another technical field is computer-implemented decision trees. A further field is computer-implemented methods and computer systems that are configured or programmed to automatically configure other application programs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Increases in hardware and software support costs have given way to a new technology delivery model in which an application service provider hosts, for the use of many user computers or customer computers, instances of applications that are coupled to data storage units on networked devices that are owned by the application service provider. The application service provider's customers, typically business enterprises, connect to the hosted applications via a web browser and enter data via the applications with the expectation that the data entered will be available on-demand whenever needed. The applications often are multi-tenant, software-as-a-service (SaaS) applications in which multiple customer entities share the same distributed database but software security controls prevent one entity from accessing data of others.

The ultimate purpose of the applications can vary. Examples include calculation of incentive compensation credits or amounts, customer relationship management, or data analytics. The applications may be complex, with hundreds of features or functions and dozens to hundreds of configuration parameters, settings, and values that govern the specific appearance, operation, and workflow of the applications for a particular entity. The configuration parameters of one entity may be completely different than for a second entity. Further, configuring all other functions of an instance of such a system, for use by a particular enterprise also is complex. An example of a required configuration item is which date format to use, such as DD/MM/YYYY or MM/DD/YYYY.

The process of selecting and digitally storing the configuration parameters for a specific entity is known as "onboarding" that entity. Past technology has required long discussion sessions involving entity representatives and application representatives, completion of data collection forms, or preparation of worksheets, before onboarding can begin. In some cases, extensive individualized configuration work by professional services representatives of the SaaS application has been required. While the flexibility of modern SaaS applications provides power to organizations, the onboarding process as previously described is lengthy, time-consuming, resource-intensive, and error-prone since many manual operations are required. There is a need to reduce the total time, CPU cycles, and machine resources such as memory, storage, and network bandwidth, required to execute onboarding of an entity in relation to a complex SaaS application.

SUMMARY

The appended claims may serve as a summary of the invention.

BRIEF DESCRIPTION OF THE DRAWINGS

In the drawings:

FIG. 2B illustrates a programmable process, method or algorithm for executing the application server computer of FIG. 1.

FIG. 3 illustrates an example graphical user interface rendering of a question.

FIG. 5 illustrates an example requirement and design document that may be automatically generated using programmatic objects formed from answers to questions.

FIG. 7 illustrates a computer system with which one embodiment could be implemented.

DETAILED DESCRIPTION

Figure 1:
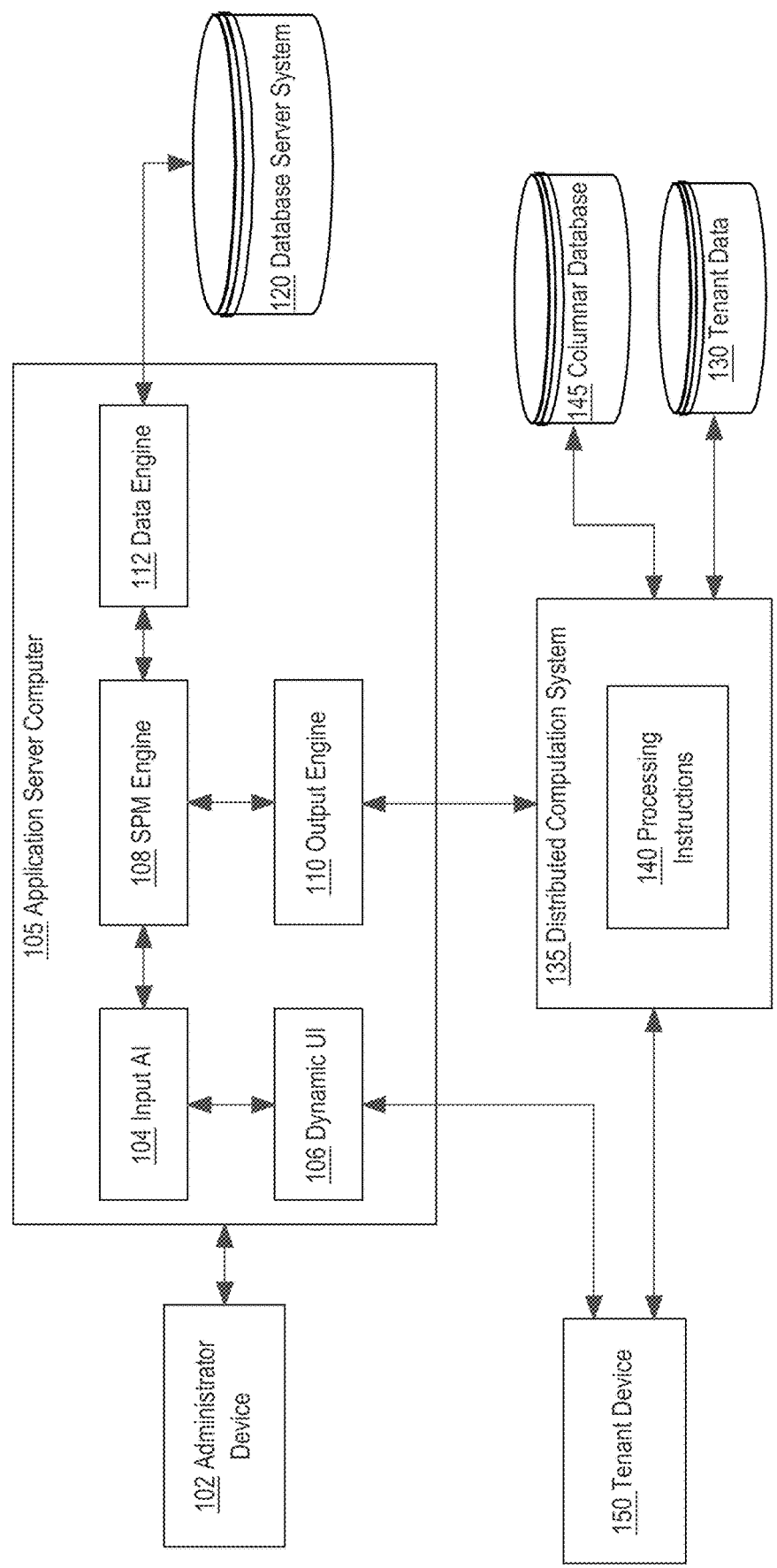
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program a computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in sections below according to the following outline:
  1. General Overview
  2. Structural and Functional Overview
  3. Example of Markup Language Instructions and Application Rules or Configuration
  4. Implementation Example—Hardware Overview

1. General Overview

In an embodiment, the disclosure provides techniques for automatically configuring application programs. Embodiments may be used in a variety of practical applications and to address a variety of onboarding complexities that otherwise interpose delays in configuring an instance of an application. In some embodiments, the onboarding and configuration process may be automated by establishing a digitally stored set of questions; automatically selecting and presenting questions in a graphical user interface, based upon a stored decision tree representing paths of questions dependent upon answers; receiving answers to the questions; based on answer data, identifying contextually relevant domain objects and their attributes; using the domain objects, automatically generating design documentation and configuration rules in a symbolic language; uploading the configuration the rules into the application instance for parsing and installation, resulting in modifying a configuration of the application instance.

In one embodiment, a computer-implemented method comprises, using a server computer that is communicatively coupled to an instance of an application program of a multi-tenant computer system, collecting answer data from a tenant device in association with onboarding a tenant to the application program, programmatically selecting a plurality of question data representing questions concerning the tenant and/or the application program, to cause digitally graphically rendering of the question data in a graphical user interface of a display device coupled to the tenant device, and to select other question data under stored program control via a decision tree; receiving answer data from the tenant device in response to the rendering of the question data; automatically repeating the foregoing to obtain a complete set of answer data; based on applying pre-defined programmatic rules to the answer data, identifying a plurality of contextually relevant domain objects and storing the domain objects in main memory; using one or more programmed transformations, based on the domain objects, automatically generating one or more configuration files for the instance of the application program, the configuration files being formatted for machine parsing at the instance of the application program to cause automatic modification of one or more configuration parameters of the instance of the application program; uploading the one or more configuration files to the instance of the application program to cause the modification.

In another embodiment, a computer-implemented method comprises, using a server computer that is communicatively coupled to an instance of an application program, and under stored program control: collecting answer data from a computing device by executing input AI instructions, to programmatically select a plurality of question data representing questions about configuration values of the application program, to cause rendering the question data in a user interface of a display device coupled to the computing device, and to select other question data automatically via a decision tree embodied in the input AI instructions; receiving a plurality of answer data from the computing device in response to the rendering of the question data; automatically repeating executing the input AI instructions and receiving the plurality of answer data to obtain a complete set of answer data; based on applying pre-defined programmatic rules to the answer data, identifying a plurality of contextually relevant domain objects and storing the domain objects; applying one or more programmed transformations to the domain objects to result in automatically generating one or more configuration files for the instance of the application program, the configuration files being formatted for machine parsing at the instance of the application program to cause automatic modification of one or more configuration parameters of the instance of the application program; uploading the one or more configuration files to the instance of the application program to cause the modification.

In one aspect, the method further comprises, using the output engine instructions and a word processor transformation, based on the domain objects, automatically generating one or more requirement and design documents corresponding to the one or more configuration files. In another aspect, the automatically generating one or more configuration files is driven by an extensible markup language (XML) transformation that the server computer parses and applies to the domain objects to result in generating the one or more configuration files as XML files. In another aspect, the question data comprises a question flow of digitally stored, structured, language-independent set of declarations, the declarations comprising, for each possible answer to each question, an identifier of a next question, the server computer being programmed to read the declarations and to branch execution to a particular next question based upon the identifier of the next question.

In still another aspect, the input AI instructions are programmed to read the question flow, to store, in main memory, a decision tree comprising nodes representing question identifiers, answer labels, and next question identifiers for each of the answer labels, and to execute the decision tree using the answer data to result in selecting the next question. The question data may comprise declarations of questions and metadata concerning the questions, the metadata including visual rendering instructions, the input AI instructions being programmed to read the question data and to call dynamic user interface instructions with the visual rendering instructions to cause digitally graphically rendering of the question data in a graphical user interface of a display device coupled to the computing device. The pre-defined programmatic rules may comprise references to one or more of the answer data or programmatic variables that have been populated with values obtained from the answer data, and the pre-defined programmatic rules declaring as consequences the specific domain objects and attribute values to populate in the domain objects based on one or more of the answer data or programmatic variables.

The method may further comprise applying an extensible markup language (XML) transformation to the same domain objects that have been populated to result in generating the one or more configuration files as XML files. The instance of the application program may be a particular tenant instance of a multi-tenant application program that is programmed to execute sales performance management (SPM) functions, and further comprising executing the collecting the answer data in association with onboarding a particular tenant to the particular tenant instances of the application program.

Embodiments have been found, via experimentation, to substantially reduce the total time, CPU cycles, and machine resources such as memory, storage, and network bandwidth, required to execute onboarding of an entity in relation to a complex SaaS application.

In one implementation, the techniques of the disclosure have been used for automatically configuring a complex computer multitenant SaaS enterprise-class application software system programmed for calculating compensation awarded to incentive-based sales personnel. In some environments, such as in pharmaceutical sales, software sales and other industrial sectors, staff are organized in hierarchies or pyramids in which a junior person's compensation is a certain percentage of a particular customer sale, and others in other hierarchical levels are compensated with other percentages. Factors such as customer location, what they buy, quantity, date purchased, when fees are received and so forth can influence these comp plans, which become complex quickly. Embodiments may be useful in software systems that are programmed to define compensation plans and contributing factors differently for every person in an organization, and executing calculations as needed, such that output is correct on a given day and with given conditions. In this context, establishing rules for the comp plans may be complex and time-consuming, especially when a new entity is added or "onboarded" to the system. While one embodiment has been used in this context, other embodiments may be used in other application areas.

In the following description reference will be made to both data stores and databases. A data store is a repository for data. Similarly, a database is structured data store. A database may be structured in any suitable way and should not be limited by the examples provided herein. Further, while reference may be made to either a data store or database, the invention is not limited to one or the other. In other words, when a database is used to describe one embodiment of the invention, a data store may also be used. Likewise, if a data store is used to describe another embodiment, a database may also be used.

Big data environments are becoming an increasingly important aspect of all companies. The insights that can be gained by analyzing large quantities of data are invaluable. Many different methods, programs, and solutions have been developed. Multitenancy refers to a single instance of software running on a server and servicing multiple tenants. A "tenant," in this context, typically is a legal entity that has no relationship to another tenant, and in fact plural tenants in the system may be competitors who do not share data for competitive reasons.

Apache HBase is a non-relational distributed database capable of handling tremendous amounts of data in an efficient manner. HBase may be used in conjunction with a multitenant service or application. For example, an HBase database may be used by many companies to store their compensation data in a shared database coupled via networks to one or more server computers that execute instances of server-based applications that implement a multitenant service or system. An example of a multitenant system is XACTLY INCENT ENTERPRISE, commercially available from Xactly Corporation, San Jose, Calif.; it is hosted by a service provider to provide shared access to custom applications that provide specialized analysis, reporting, and visualization of the compensation data. While use of the applications or application instances may be shared, data is effectively segregated by tenant to prevent transfer of confidential information of tenant to another.

In an embodiment, each company retains full access to its private data, and may also gain access to aggregated, anonymized data from all other tenants. Alternatively, the aggregated data may not be anonymized. The aggregated data may be made available in many different ways and may be used by each individual company as a benchmark for use in a variety of ways, such as determining whether their employees are properly compensated.

For purposes of illustrating a clear example, some sections of this disclosure may refer to "SPM objects," where "SPM" refers to "Sales Performance Management," which is one class of application program that can be implemented as a multi-tenant SaaS system. However, the references to SPM are intended as one example domain of application only. Other embodiments may use objects or techniques that are optimized for other domains, vertical markets, or areas of industrial application. The program architecture and functional steps that are described herein are not limited to SPM and may be applied to any other functional domain.

2. Structural & Functional Overview

FIG. 1 illustrates a distributed computer system showing the context of use and principal functional elements with which one embodiment could be implemented.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of automatic configuration of application programs. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 illustrates application server computer 105 that is coupled via a wired or wireless connection, or a combination thereof, to administrator device 102, database server system 120, distributed computation system 135, and tenant device 150. Application server computer 105 comprises input artificial intelligence (AI) 104 which is coupled to dynamic user interface (UI) instructions 106; SPM engine 108, which is coupled to output engine 110; and data engine 112. The distributed computation system 135 comprises processing instructions 140 and is coupled to data storage devices comprising a columnar database 145 and tenant data 130. Each of the input AI 104, dynamic UI 106, SPM engine 108, output engine 110, data engine 112, and processing instructions 140 may comprise one or more sequences of stored program instructions which, when executed using one or more processors of the application server computer or distributed computation system 135 cause those computers to execute the functions that are further described in other sections herein.

The distributed computation system 135 may be implemented using a computer that is independent from the application server computer 105 although in some embodiments both computers may be implemented as different virtualized computing instances in the same datacenter. In an embodiment, application server computer 105 implements the principal techniques of the present disclosure, and distributed computation system 135 represents an instance of a multi-tenant SaaS application that is the subject of automatic configuration using the present techniques. The processing instructions 140 may represent an application instance that is ultimately configured.

In one embodiment, each of the application server computer 105 and the distributed computation system 135 may be any computing device, including but not limited to: servers, racks, work stations, personal computers, general purpose computers, laptops, Internet appliances, wireless devices, wired devices, multi-processor systems, mini-computers, and the like. Although FIG. 1 shows a single element, the application server computer 105 broadly represents one or multiple server computers, such as a server cluster, and the server computer may be located in one or more physical locations. Application server computer 105 also may represent one or more virtual computing instances that execute using one or more computers in a datacenter such as a virtual server farm.

Application server computer 105 is communicatively connected to database server system 120, distributed computation system 135, and administrator device 102 through any kind of computer network using any combination of wired and wireless communication, including, but not limited to: a Local Area Network (LAN), a Wide Area Network (WAN), one or more internetworks such as the public Internet, or a company network. Application server computer 105 may host or execute applications, software, and executable instructions other than shown in FIG. 1 to facilitate various aspects of embodiments described herein.

Administrator device 102 represents any form of computing device that is associated with an administrative user of application server computer 105. The administrator device 102 may be used to configure questions for processing using input AI 104, to inspect test data and expected results data, and other functions as further described in other sections herein. Administrator device 102 may be a laptop computer, desktop computer, mobile computing device, or other computing device.

In one embodiment, database server system 120 hosts or executes one or more of a relational database, object database, flat file system, or other data storage to support execution of the sets of instructions represented by input AI 104, dynamic UI 106, SPM engine 108, output engine 110, and data engine 112. Database server system 120 may be configured with tables, files, or other logical data storage structures to digitally store questions, answers, decision trees, domain objects, configuration files, test data, expected results data, and other digitally stored data as further described in other sections herein. Database server system 120 includes database 125, which may be stored on any suitable storage device such as one or more hard disk drives, memories, or any other electronic digital data recording device configured to store data. Although database server system 120 is shown as a single element, database server system 120 may span multiple devices located in one or more physical locations and may span multiple separate databases within those devices. For example, database server system 120 may be located on one or more nodes in a data warehouse or warehouses. Additionally, in one embodiment, database server system 120 may be located on the same device or devices as application server computer 105. Alternatively, database server system 120 may be located on a separate device or devices from application server computer 105.

In one embodiment, distributed computation system 135 is communicatively coupled to one or more database server systems storing data that is in production and accessible by tenants of the distributed computation system 135, such as tenant device 150. The processing instructions 140 may be programmed to allow tenant device 150 to make changes to tenant data 130, before the changes are checked and subsequently propagated to other special purpose databases, such as columnar database 145. In one embodiment, tenant data 130 is data related to a specific tenant of application server computer 105, and processing instructions 140 are programmed to enforce security controls so that only authorized tenant devices 150 of a particular tenant can access the tenant data 130 of that tenant. A tenant may be an individual or entity that has a customer relationship with an owner or operator of the distributed computation system 135. Although tenant data 130 is depicted as a single element, there may be a private set of data for each tenant of distributed computation system 135 that is accessible only by the tenant associated with that tenant data. There may be any number of tenants, any number of separate tenant datasets, and any number of tenant devices 150 of the same or different tenants. Tenant data 130 may relate to any type of data, such as personal information, business information, governmental data, compensation data, health data, environmental data, police/military data, etc. Tenant data 130 may span any time period.

Tenant data 130 is accessible by an authorized tenant device 150 at any time for modifications, calculations, analysis, export, import, or any other action. While most of tenant data 130 is editable by the tenant, some portions thereof, such as calculated values, may not be editable by the tenant. Multiple copies of tenant data 130 may be stored in different locations, such as tenant data 130 in columnar database 145. The copies may not be exactly the same—there may be a delay in propagating any changes made to the various copies, or different versions may be maintained. When copied, tenant data 130 may be reformatted or otherwise organized into different forms for any purpose. Some copies of tenant data 130 may be read-only, such as a copy used for analytics or other calculations or processing.

In practical embodiments, FIG. 1 may be implemented with thousands of different instances of processing instructions 140 and/or distributed computation system 135, for thousands of different tenants. If each instance has hundreds of configuration parameters for different parts of a SaaS application implementing complex logic, then manual configuration of all the instances for all tenants becomes impractical for human completion within a reasonable time, and onboarding a new tenant will use excessive resources without the techniques that are described herein.

In one embodiment, distributed computation system 135 is a distributed computation system that stores data, performs distributed processing or calculations on data, and is in production and accessible by tenant device 150. Distributed computation system 135 may include any needed components such as one or more processors, one or more memories or other digital storage devices, etc. Distributed computation system 135 is configured to perform data retrievals for analytics requests and includes processing instructions 140 to perform processing of retrieved data for analytics. Distributed computation system 135 also includes columnar database 145, which may be stored on any suitable storage device such as one or more hard disk drives, memories, or any other electronic digital data recording device configured to store data. Although distributed computation system 135 is shown as a single element, distributed computation system 135 may span multiple devices located in one or more physical locations and may span multiple separate databases within those devices. For example, distributed computation system 135 may be located on one or more nodes in a data warehouse or warehouses. Additionally, in one embodiment, distributed computation system 135 may be located on the same device or devices as application server computer 105. Alternatively, distributed computation system 135 may be located on a separate device or devices from application server computer 105. Distributed computation system 135 may be implemented using any suitable formatting and may include many different databases or other components.

In one embodiment, columnar database 145 is a columnar database. A columnar database is a database implemented using any suitable methodology, such as HBase. Alternatively, or in addition, columnar database 145 may be a relational database or any other type of database. Columnar database 145 may be of any size, portioned into any number of tables or other units, and may be organized in any way. Columnar database 145 stores tenant data 130, as described above. Columnar database 145 may also store additional data, such as aggregated tenant data, or any other kind of data related to or relevant to the embodiments and functionalities described herein.

Processing instructions 140 may be programmed or configured with a database interface such as JDBC, ODBC, HBase client libraries, SPARQ, or any other interface or filesystem for communicating with columnar database 145 and tenant data 130.

Tenant device 150 may include applications, software, and/or other executable instructions to facilitate various aspects of the invention described herein. Specifically, tenant device 150 is able to send requests for accessing, adding to, deleting, or modifying tenant data 135, send analytics requests, receive results of analytics requests, and display the results of analytics requests, and any other functionalities needed by the present invention. In one embodiment, there may be any number of tenant devices, and each unique tenant may include one or more devices. Tenant device 150 is communicatively connected to application server computer 105 through any kind of computer network using any combination of wired and/or wireless communication, including, but not limited to: a LAN, a WAN, the Internet, a company network, etc.

In an embodiment, each of the tenant device 105 and administrator device 102 host or execute an operating system and a browser or browser-like application that is capable of receiving files encoded in a specified language, such as HTML or PDF, then render and visually display the files. The operating system may support a graphical user interface system or set of primitives that are programmatically callable from the browser or application to dynamically visually render text, data, and/or images on visual display devices that are coupled to each of the tenant device 105 and administrator device 102.

Tenant device 150 also is communicatively coupled to dynamic UI 106. At the time of onboarding a tenant to a multi-tenant application system, the tenant device 150 connects to dynamic UI 106 to provide answer data to a plurality of questions related to the tenant and its business, as further described for other sections herein. After all answer data is received, the application server computer 105 automatically computes configuration data for uploading to the distributed computation system 135, to custom configure it for the particular tenant. Thereafter, tenant device 150 interacts only with the distributed computation system 135 and application instructions 140 and does not need to communicate with the dynamic UI 106. Connections of these types may be facilitated using a browser at tenant device 150 to connect selectively to different URLs that invoke applications or instructions at computers 105, 135.

Figure 2A:
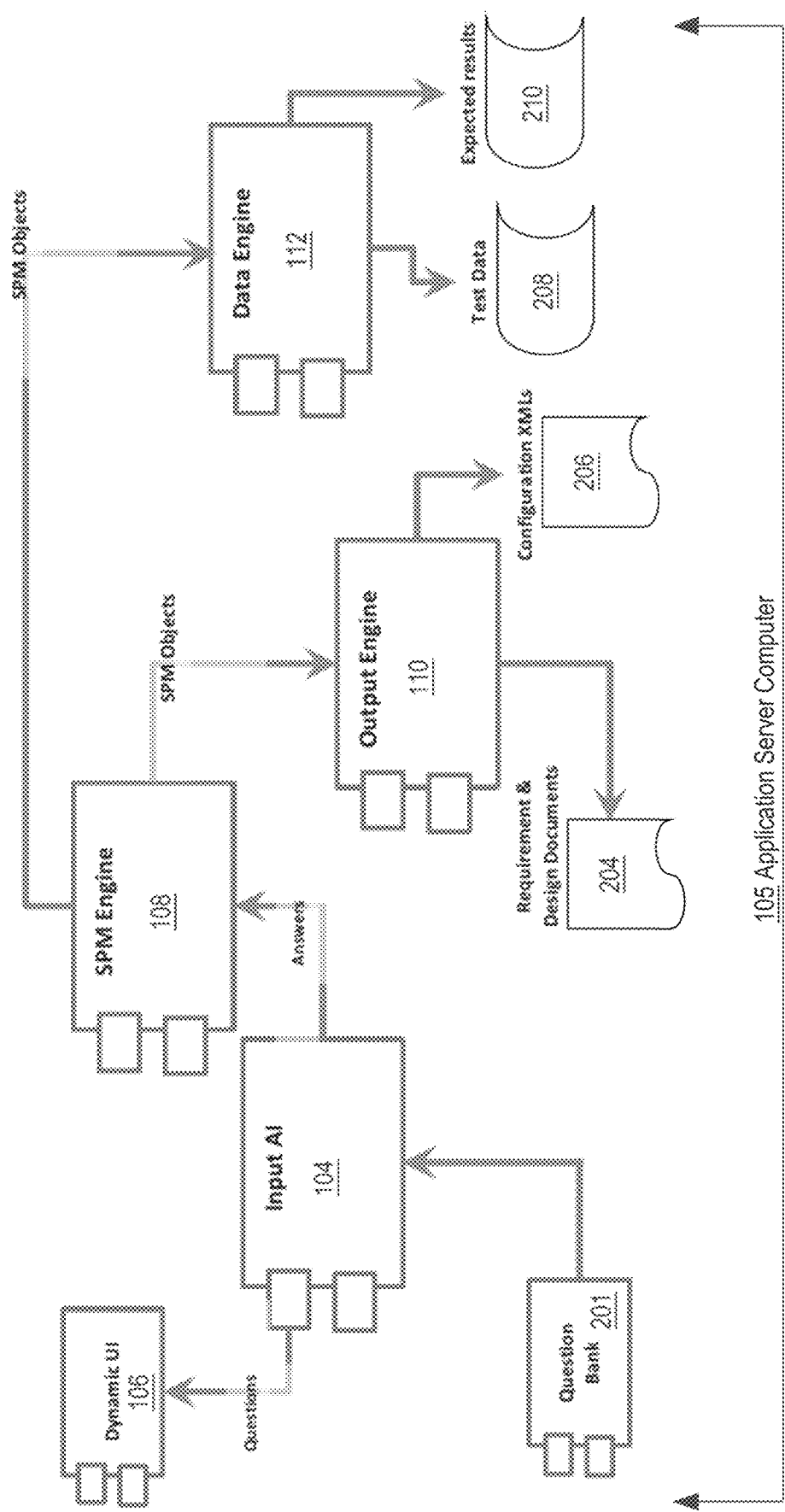
FIG. 2A illustrates further details of data flows in the application server computer of FIG. 1.

FIG. 2A illustrates further details of data flows in the application server computer of FIG. 1. FIG. 2A and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

In an embodiment, input AI 104 is programmed to access a question bank 201 and uses internally programmed logic to determine a question flow or configuration. In an embodiment, question bank 201 comprises a statically defined set of questions concerning application program configuration issues that are relevant to configuration of an application program instance. In an embodiment, input AI 104 uses a digitally stored decision tree, or other process flow or stored program logic, to direct the selection of a next question based upon an answer to a previous question. In some embodiments, questions and metadata concerning questions are digitally stored in a unified manner in the question bank 201.

Preferably, input AI 104 is free of infinite loops while allowing a repeated or iterated loop flow for certain aspects of questions and answers. For example, in an application that determines calculations for an incentive-based compensation plan system, the input AI 104 may be programmed to capture multiple details for multiple different kinds of incentives for a plan, and to permit input to specify an open-ended number of kinds of incentives, with attributes for each type of incentive. In this manner, the input AI 104 may permit an unlimited number of loop iterations while still including an answer option that allows terminating the iterations and moving onward. In an embodiment, input AI 104 is programmed to select a question based upon executing internal question configuration logic, retrieve the selected question from question bank 201, and transmit the question programmatically to dynamic UI 106.

Transmitting a question to dynamic UI 106 also may include transmitting a set of metadata concerning the question to define a form of presentation of the question, the number of permissible answers, and the type of permissible answers. The metadata in the question data may include visual rendering instructions. For example, metadata may specify a fixed plurality of allowable answers and may specify that the answers are to be presented with graphical radio buttons that are selectable via user input, so that one and only one of the allowable answers can be selected. Metadata may define answers as multiple-choice, radio buttons, text fields, date fields, number fields, currency fields, or other data types.

The dynamic UI 106 is programmed to dynamically form or create a page, file, script, or other sequences of instructions that can be visually rendered using tenant device 105 and/or administrator device 102. For example, based on the question and/or metadata received from input AI 104, the dynamic UI 106 may output dynamic HTML files that are transmitted as HTTP payloads to either the tenant device 105 or administrator device 102 for rendering a question there and prompting input representing an answer.

In an embodiment, input AI 104 also is programmed to receive answer data representing answers to the questions via dynamic UI 106 and to programmatically transfer the answer data to SPM engine 108. The SPM engine is programmed to apply a set of pre-defined SPM rules to the answer data, to result in identifying SPM objects that are contextually relevant to the answer data, and attributes of those objects. The relevant SPM objects may be digitally stored in memory or database storage and programmatically transferred to output engine 110 and data engine 112 for other uses by those functional units.

The output engine 110 is programmed to automatically generate requirement data, design data, and/or design documents 204, and one or more configuration files 206, based on the SPM objects that have been received from SPM engine 108. In some embodiments, the output engine 110 may be programmed to use domain objects from engine 108 to generate other forms of output. Examples could include an enumeration of all questions and answers, time values specifying the time elapsed to receive input to all questions, and other kinds of reports or metrics.

The data engine 112 is programmed to receive the SPM objects, apply data mapping the answers to the SPM objects with pre-determined sample values, and to automatically generate test data 208 and expected results 210 under stored program control. Test data 208 may be used to test effectiveness of the solution represented in FIG. 2A, FIG. 2B. In some embodiments, the data engine 112 may be omitted.

3. Example of Transforming Decision Tree to Rules and Configuration Values

FIG. 2B illustrates a programmable process, method or algorithm for executing the application server computer of FIG. 1, FIG. 2A. The example of FIG. 2B will be described, for convenience, in part with reference to APPENDIX 1, APPENDIX 2, APPENDIX 3. APPENDIX 1 to this specification shows a plurality of questions that may be used in an example embodiment in the SPM domain and illustrates how answers can drive a flow of different questions and the collection of a diverse set of useful answer data. APPENDIX 2 to this specification provides an example of stored answers or responses in a structured JSON format that will be compatible with many relational and non relational databases. APPENDIX 3 provides an example of programmable code that can be used to transform stored responses or answers of APPENDIX 2 into domain objects for use in generating configuration or parameter values.

Referring now to FIG. 2B, in an embodiment, at block 230, the process is programmed to select a next question from a question bank. Selecting a question may be preceded by querying a stored question configuration or decision tree to determine which question should be selected next. When execution of the process is in a first iteration of the blocks shown in FIG. 2B, the next question will be the first question at a root node of a decision tree or question configuration of input AI 104.

At block 232, the process is programmed to programmatically pass the question to a dynamic user interface, resulting in rendering the question in a user interface of a tenant device, for example.

In some embodiments, questions and metadata concerning questions are digitally stored in a unified manner in the question bank. For example, the question bank may comprise a single set of JSON code consisting of declarations of questions with associated metadata for answers and visual rendering instructions. Formatting other than JSON may be used in other embodiments. TABLE 1 is an example JSON code listing that combines declarations of questions and metadata concerning the question:

TABLE 1

DECLARATION OF QUESTION AND RELATED METADATA

```
"Org3": {
    "title": "what type of calendar does your company use?",
    "type": "array",
    "items":
        "type": "string",
        "enum": ["standard", "Custom"],
        "enumNames": ['Standard Calendar", "Custom Calendar"]
    "setVariable": {
        "name": "CalendarType",
        "prop": "answer",
        "overwrite": true
    },
    "maxItems": 1,
    "minItems": 1,
    "unigueItems": true,
    "ui": {
        "ui:widget": "checkboxes",
        "ui:help": "Note: 'Standard Calendars' refer to a Gregorian
            calendar that starts on January 1ˢᵗ
    },
    "addable": false, '
    "desc": "This will be a list of options and user can select one
        of the options."
},
```

In TABLE 1, the question is, "What type of calendar does your company use?" as specified by the "title" attribute. Metadata declared as an array of items, defines string-type answers labeled Standard and Custom, with names of answers such as Standard Calendar, Custom Calendar, an answer label of CalendarType, a maximum number of answers of "1", a UI widget type of "checkboxes," and help information. Thus, a question declaration in TABLE 1 contains all identifying information, label information, and presentation information needed to render a question in a user interface and prompt for and receive correct answers. A complete question bank comprises a large number of other questions all declared in a manner similar to TABLE 1.

Embodiments may have dozens, or hundreds of questions declared in this manner and there is no upper limit on the number of questions that can be defined. Questions may be defined in sets, within hierarchies; for example, embodiments may be programmed to declare one set of questions pertaining to a particular incentive compensation plan, as well as multiple plans that invoke the sets, so that each set of questions is asked repeatedly in relation to each of the multiple plans. Each plan may have multiple incentives, each incentive being associated with a separate question set or with one question set that is repeatedly presented and asked for each incentive.

A single question bank can be used for all candidate tenants. JSON files may be used to create and store a question bank.

Figure 3:
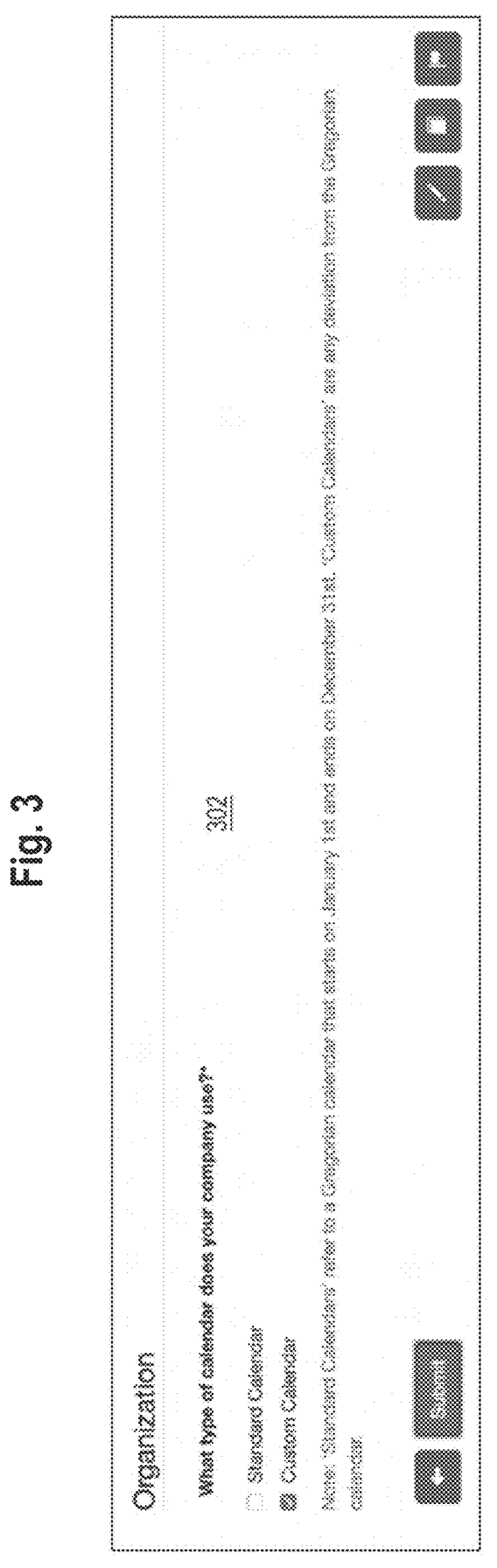

FIG. 3 illustrates an example graphical user interface rendering of a question. In this example, a GUI panel 302 presents the same question as in TABLE 1, and the metadata defined in TABLE 1 has been used programmatically to drive the presentation of FIG. 3, to prompt a single answer using graphical checkboxes to select Standard Calendar or Custom Calendar, with help text displayed in association with the possible answers. Thus, the question bank defines metadata for all questions that can be asked, and the dynamic UI 106 is programmed to cause rendering a UI for a selected question based on the metadata.

At block 236, the process is programmed to receive input specifying an answer to the question, which may be digitally stored as answer data. In one embodiment, using a browser to enter a response to a question causes submitting a form to server-side code associated with SPM engine 108, which is programmed with "setGlobalVariable" program logic to cause storing, as responses are entered, global variable values in portions of structured response data in the format of APPENDIX 2. For example, the "SetVariable" declarations in TABLE 1 cause creating and storing, in response to an answer or response, one or more global variable values that are available throughout all later processing steps. In this manner or using other mechanics, the storage format of APPENDIX 2 may be dynamically updated as responses or answers to questions are received.

Global variable values captured in the storage format of APPENDIX 2, based on responses to questions and the declarations of TABLE 1, may serve as a basis of instantiating domain objects. Examples of global variable values include counts of the number of incentive plans of an entity and counts of the number of incentives in each plan. Global variables may serve as the highest-level metadata concerning answers that have been received in response to questions and the recordation of global variable values in storage in the format of APPENDIX 2 enables all other functional elements to retrieve essential values to drive the instantiation of domain objects. Block 236 may include hard-coded logic to cause storing values that are calculated, based on a response, in the format of APPENDIX 3. Logic of this type may be programmed to cause creating and storing one or more lists of unique items ("All Lists") in APPENDIX 2 and these lists of unique items later may drive the instantiation of domain objects.

At block 238, the process is programmed to query the question configuration to determine a next question, based upon the answer data for an answer to the prior question that was obtained at block 236.

In an embodiment, answer data may be stored in the database for use in subsequent steps. In some embodiments, answer values are defined as global variables in a JSON blob that is stored in database storage. In other cases, local variable values may be used. In one embodiment, however, all answer values are captured in structured storage in a database for use by subsequent steps such as generating objects for rules and configuration.

At block 240 the process is programmed to test whether the end of all questions has been reached, based on a further query to the question configuration. If a query for another question returns NULL, for example, or a terminal node of the decision tree, then control transfer to block 242; if the decision tree or question configuration directs processing to another node or question, then control transfers back to block 230 to select the next question and iterate through block 232, block 234, block 236, block 238, block 240.

Figure 4:
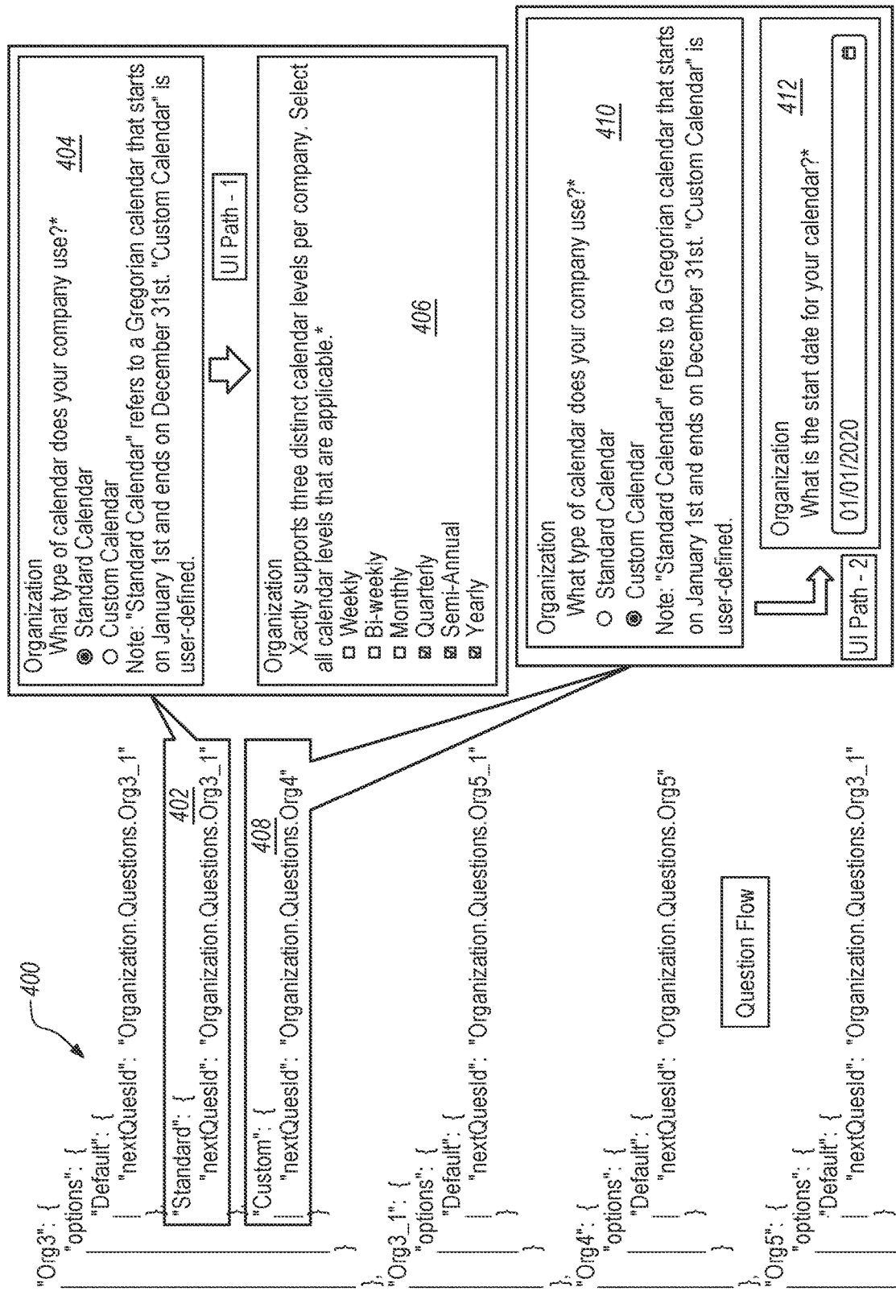
FIG. 4 illustrates an example of a programmed question flow and its use in rendering a plurality of different graphical user interface elements.

In an embodiment, the input AI 104 is programmed with sequences of instructions to define a question flow based upon answers that are received to questions. FIG. 4 illustrates an example of a programmed question flow and its use in rendering a plurality of different graphical user interface elements. In an embodiment, instructions 400 comprise declarations 402, 408 that specify, for particular answer data, an identifier of a next question. It will be seen in FIG. 4 that a question flow comprises a structured, language-independent set of declarations specifying question identifiers, number of possible answers, answer labels, and next question identifiers for each of the answer labels. An example of a question identifier is "Org3" and its answers are "Standard" and "Custom"; a default answer also is specified. For each answer, a next question identifier is provided. The input AI instructions will be programmed to read the question flow and digitally store, in main memory, a decision tree comprising nodes representing question identifiers, answer labels, and next question identifiers for each of the answer labels. JSON files may be used to create and store a question flow.

For example, declaration 402 specifies that if the answer to the calendar question of FIG. 3, which is reproduced in panel 404 of FIG. 4, is "Standard," then the next question is "Organization.Questions.Org3_1" as indicated by the declaration following the token "nextQuesId". That question, when processed, causes rendering the GUI panel 406 shown in FIG. 4 after panel 404. However, if the answer to the calendar question of FIG. 3 was "Custom," then declaration 408 specifies that the next question is "Organization.Questions.Org4", which results in presenting a second UI path as shown in panel 410, panel 412 of FIG. 4. The input AI 104 is programmed to parse and form an in-memory representation of all instructions 400, such as a decision tree, and is programmed with a programmatic method implementation of the token "nextQuesId". Therefore, input AI 104 is capable of determining the next question to be asked based upon all available branches as represented in memory, and the answer to the current question.

At block 242, the process is programmed to validate all the answer data that was received, generate a design for configuration of an application program instance based upon the answer data, and generate domain objects for use in subsequent processing steps. In an embodiment, SPM engine 108 is programmed to execute block 242 and is programmed with defined rules to determine what programmatic domain objects to generate based upon all answer data that has been collected and stored. In some embodiments, SPM engine 108 is programmed with coded routines to populate programmatic variables within the SPM engine with specific answer values that have been received in response to use of the question bank.

In an embodiment, TABLE 2 and TABLE 3 set forth examples of rules. Each of TABLE 2, TABLE 3 comprises a set of programmed, symbolic declarations for business rules which are expressed as programmatic functions in a source code language. Each function has a unique identifier such as Dl; a validity value such as on=TRUE; a priority value indicating relative priority for evaluation or execution; a rule type, such as CREDIT; a rule subtype, such as DIRECT; one or more conditions under which the rule is applied; and one or more consequences or results of implementing the rules.

Consequences may include declaring compensation credit rules for execution in the distributed computation system 135 or instructions 140, values for configuration objects, setting table values, setting quota values, or any other operational aspect or configuration attribute that the target application program, distributed computation system or instructions 140 accept, use, or interoperate with. Thus, the consequences can include declarations to create, update, or delete any configuration value of a target application program. These declarations of consequences have explicitly declared relationships to answer data that has been received based on use of the question bank.

TABLE 2

Predefined SPM Rule

```
const configurationRules = [
  {
    id: "G1",
    on: true,
```

TABLE 2-continued

Predefined SPM Rule

```
    priority: "1001",
    RuleType: "General",
    RuleSubType: "None",
    condition: function (R) {
       R.when(this.Namespace !== undefined);
    },
    consequence! function (R) {
       this.NamePrefix = '$(this.Namespace}_';
       this.Quota = this.Quota ? '${this.Namesnace}${this.Quota}':
       this.Quota;
       if (this.RateTable) {
          let r = JSON.parse(this.RateTable);
          r.tableName = '${this.NamePrefix}${r.tableName}';
          this.RateTable = JSON.stringify(r);
       }
       if (this.WeightTable) {
          let w = iSON.parse(this.WeightTable);
          w.tableName = '${this.NamePrefix}${w.tableName}';
          this.WeightTable = JSON.stringify(w);
       }
       R.next( );
    }
  },
```

For example, TABLE 2 specifies a rule identifier of G1 and an active or TRUE validity value. The priority value "1001" ranks the rule relative to other priority values. The rule type is General and the rule has no sub types. The "condition" declaration specifies that the rule is used when a Namespace has been defined, perhaps via a prior rule. The values for Prefix, Quota information, Rate Table and Weight Table are populated if the answer data had included values for answers to rate table and weight table questions. The code of TABLE 2 does not explicitly refer to answer data, but separate code acting as an abstraction layer may be programmed in SPM engine 108 to transfer values of actual answers to populate values of specific variables that are used in the code of TABLE 2.

TABLE 3

Predefined SPM Rule

```
    id: "D1",
    on: true,
    priority: "1000",
    RuleType: "Credit",
    RuleSubType: "Direct", condition: function (R) {
       R.when(this.CreditType.indexOf("D") >= 0);
    consequence: function (R) {
       this.Rule.creditRule.push({ condition: [], computation: [] });
       this.Rule.CreditRule[this.Rule.CreditRule.length - 1].RuleType "DirectRule";
       this.Rule.CreditRule[this.Rule.CreditRule.length - 1].RuleName = ${this.NamePrefix}DC_$(this.Incentiye}';
       this.Rule.CredttRule[this.Rule.CreditRule.length - 1].CreditType = this.Incentive;
       this.Rule.CreditRule[this.Rule.CreditRnle.length - 1]Assignment = this.Role;
       this.Rule.CreditRule[this.Rule.CreditRule.length - 1].condition.push({
          Source: "OrderItem",
          Field: "OrderType",
          Operation: "Equals",
          CompareValue: ' ' ${this.Source}' ',
          LogicalOperatorType: "NONE",
          FormulaType: "Relational"
       }):
       const { Rule, configObjects, . . .sourceData } = this;
       this.configObjects.CreditType.push({ Name: this.Incentive, sourceData: sourceData });
       this.configObjects.OrderType.push({ Name: '$(this.Source}', sourceData: sourceData });
       this.configObjects.BatchType.push({ Name: '${this.Source}', TransactionSubType: "Revenue", sourceData: sourceData });
       R.next( );
    }
  }.
```

In TABLE 3, the statement "R.when(this.CreditType.indexOf("D")>=0);" ties the successive coded rules to previously received answer data indicating that the number of direct (D) credit rules is greater than zero. Furthermore, as seen for example in the four (4) lines of code of TABLE 3 preceding the loopback declaration "R.next( )", the declarations include instructions to create specific programmatic objects, comprising a CreditType object, OrderType object, and BatchType object. The specific rules and consequences of TABLE 3, TABLE 4 are examples for one solution domain but different application domains may use different metadata values, conditions, consequences, or other declarations.

In the example of APPENDIX 3, mappings of responses to domain objects are hard-coded. For example, the example of APPENDIX 3 shows programmatic tests for determining whether certain question(s) relating to organizations have been answered and, if so, setting certain default variable values, instantiating and populating certain objects. In other embodiments, mappings may be data-driven; for example, such mappings may be expressed in executable code or expressions that are stored in a database table having a key value or key column corresponding to a response, or to a question and response.

In some embodiments, response storage in the format of APPENDIX 2 may include tag values that instruct programmatic logic how to parse response values and/or what type of information a response represents. For example, questions in TABLE 1 may declare "parsetag" values that are tagged to responses when they are stored in the format of APPENDIX 2, and executable code of APPENDIX 3 then may execute over the values of APPENDIX 2 by inspecting "parsetag" values and branching to different executable statements depending on the values. Other embodiments could rely on hard-coded question identifier values rather than "parsetag" values.

In some embodiments, response storage in the format of APPENDIX 2 may include PATH values that act as keys to locate responses to specified questions. The PATH values word processor transformations and extensible markup language (XML) transformations.

As a first example, TABLE 4 shows a Word document transformation that may be programmed as part of output engine 110 to transform in-memory domain objects into a requirements document or design document. Transformations may be expressed as JSON blobs, using source code in a human-readable programming language, or using other structured expression.

TABLE 4

```
compMatrix_json["w:tbl"]["w:tr"].push(row);
//3) Add Plans and Credit Rules
plan_data.forEach(function (plan, index) {
    //create row:
    var row = {
        "w:trPr": { },
        "w:tc": [
            {
                "w:tcPr": 1
                "w:tcBorders": {
                    "w:top":    { "@w:val": "single", "@w:sz": borderSize, "@w:space": "0", "@w:color": "auto"},
                    "w: left":  { "@w:val": "single", "@w:sz": borderSize, "@w:space": "0", "@w:color": "auto"},
                    "w: right": { "@w:val": "single", "@w:sz": borderSize, "@w:space": "0", "@w:color": "auto"},
                    "w: bottom":{ "@w:val": "single", "@w:sz": borderSize, "@w:space": "0", "@w:color": "auto"}
                },
                "w:vAlign": { "@w:val": "center" }
            },
            "w:p": [
                {
                    "w:pPr":
                        "w:jc": { "@w:val": "center"},
                        "w:rPr": {
                            "w:rFonts": { "@w:ascii": fontType, "@w:hAnsi": fontType },
                            "w:color": { "@w:val": "FF0000"},
                            "w:sz": { "@w:val": fontSize }
                        }
                },
                "w:r": {
                    "w:rPr": {
                        "w:rFonts": { "@w:ascii": fontType, "@w:hAnsi": fontType },
                        "w:color": { "@w:val": fontColor },
                        "w:sz": { "@w:val": fontSize }
                    },
                    "w:t": { "#text": plan.name.to5tring( ) } }
            }
``` may define a sequential execution path for locating response values to questions that were previously asked for use in instantiating the domain objects.

At block 243, the process is programmed to automatically generate requirement and/or design documents based on the domain objects that were generated at block 242. In an embodiment, the requirement and/or design documents are human readable and provide a way to communicate to human readers the configuration changes that will be captured in encoded application configuration files for uploading to the application instance and machine processing there.

At block 244, the process is programmed to automatically generate one or more configuration files for a particular instance of an application program.

In an embodiment, the output engine 110 is programmed to execute block 243, 244. In an embodiment, the output engine 110 executes both block 243, block 244 using programmed transformations. Examples of transformations are FIG. 5 illustrates an example requirement and design document that may be automatically generated using programmatic objects formed from answers to questions. For example, the transformation of TABLE 4 and the domain objects that have been previously described may be processed together to produce document 502 of FIG. 5. The document 502 may comprise a header text area 504 that states a particular calculation or rule that will be represented in a configuration. The document 502 may comprise a data table 506 having a plurality of rows each divided into columns that are associated with attributes of a calculation.

The specific format of a requirement and design document may vary in different implementations and TABLE 4 defines a flexible method to control output of documents using a variety of different formats and content.

As another example, TABLE 5 shows an extensible markup language (XML) output transformation that may be programmed to transform the domain objects into an XML configuration file for later upload to an instance of an application program.

TABLE 5

XML Output Transformation

```
class CreditRule extends GenericElement {
   constructor( ) {
      super( );
      }
getXML(typeName, entityType, elemList) {
         var rules data = {};
            for (let elem in elemList) {
            let action = [],
               ruleName = [],
               elementName = [],
               resultName = [],
               orderNumber = [],
               resultRateType x [],
               elementType = [];
            for (let i = 0; i < elemList[elem]["computation"]["ComputationData"].length; i++) {
               action. push({
                  "imp:Service": {
                     "imp:Name": "Credit",
                     "imp:ServiceParam: [
                        {
                           "imp.ParamName": "Name",
                           "imp:ParamType": 0,
                           "imp:ParamValue":elemList[elm]["computation"]["ComputationData"][i]["ResultName"]
                        },
                        {
                           "imp:ParamName": "Value",
                           "imp:ParamType": 2,
                           "imp:ParamValue": elemList[elem]["computation"]["ComputationData"][i]["Value"],
                           "imp:FormulaName": elemList[elem]["computation"]["ComputationData"]["Value"]
                        },
                        {
                           "imp:ParamName": "ValueUnitType",
                           "imp:ParamType": 0,
                  "imp:ParamValue": elemList[elem]["computation"]["ComputationData"][i]["ValueUnitType"]
                        },
                        {
                           "imp:ParamName": "Maximum",
                           "imp:ParamType": 0
                        },
                        {
                           "imp:ParamName": "Rollable",
                           "imp:ParamType": 0,
                           "imp:ParamValue": "on"
```

TABLE 6 shows an example of an output XML configuration file that can be uploaded to an instance of an application program, parsed and applied to configure the instance.

TABLE 6

Generated Config XML

```
<? xml version="1.0" encoding="utf-8"?>
<imp:IncentObjects xmlns:imp="http://com.xactly.toots/importgen">.
   <imp:ExportData>
      <imp:ObjectType>RULE</imp:ObjectType>
      <imp:ObjectData>
         <imp:ColumnData>
            <imp:Name>Name</imp:Name>
            <imp:Type>java.lang.String</imp:Type>
            <imp:EntityType>com.xactly.icm.compplan.entity.Rule</imp:EntityType>
            <imp:ColValue>
               <imp:RowNum>0</imp:RowNum>
                  <imp:Value>DC_New Business</imp:Value>
            </imp:ColValue>
         </imp:ColumnData>
         <imp:ColumnData>
               <imp:Name>Description</imp:Name>
            <imp:Type>java.lang.String</imp:Type>
            <imp:EntityType>com.xactly.icm.compplan.entity.Rule</imp:EntityType>
            <imp:ColValue>
               <imp:RowNum>0</imp:RowNum>
            </imp:ColValue>
         </imp:ColumnData>
         <imp:ColumnData>
```

TABLE 6-continued

Generated Config XML

```
        <imp:Name>RuleType</imp:Name>
        <imp:Type>java.lang.Integer</Imp:Type>
        <imp:EntityType>com.xcactly.com.compplan.entity.Rule</imp:EntityType>
        <imp:ColValue>
            <imp:RowNum>0</imp:RowNum>
            <imp:Value>DirectRule</imp:Value>
        </imp:ColValue>
    </imp:ColumnData>
    <imp:ColumnData>
        <imp:Name>HoldType</imp:Name>
        <imp:Type>java.lang.Integer</Imp:Type>
        <imp:EntityType>com.xactly.icm.compplan.entity.Rule</imp:EntityType>
        <imp:ColValue>
            <imp:RowNum>0</imp:RowNum>
        </imp:ColValue>
    </imp:ColumnData>
    <imp:ColumnData>
        <imp:Name>PrimaryRuleName</imp:Name>
        <imp:Type>java.lang.String</imp:Type>
        <imp:EntityType>com.xactly.icm.compplan.entlty.Rule</imp:EntityType>
        <imp:ColValue>
            <imp:RowNum>0</imp:RowNum>
        </imp:ColValue>
    </imp:ColumnData>
</imp:columnData>
```

At block 250, the process is programmed to upload the configuration files, from block 244, to the instance of the application program, where the configuration files may be parsed and processed by machine to cause automatic configuration of the application program. The configuration implemented in this manner can cause the automatic programming of a variety of parameters, attributes and values.

Figure 6:
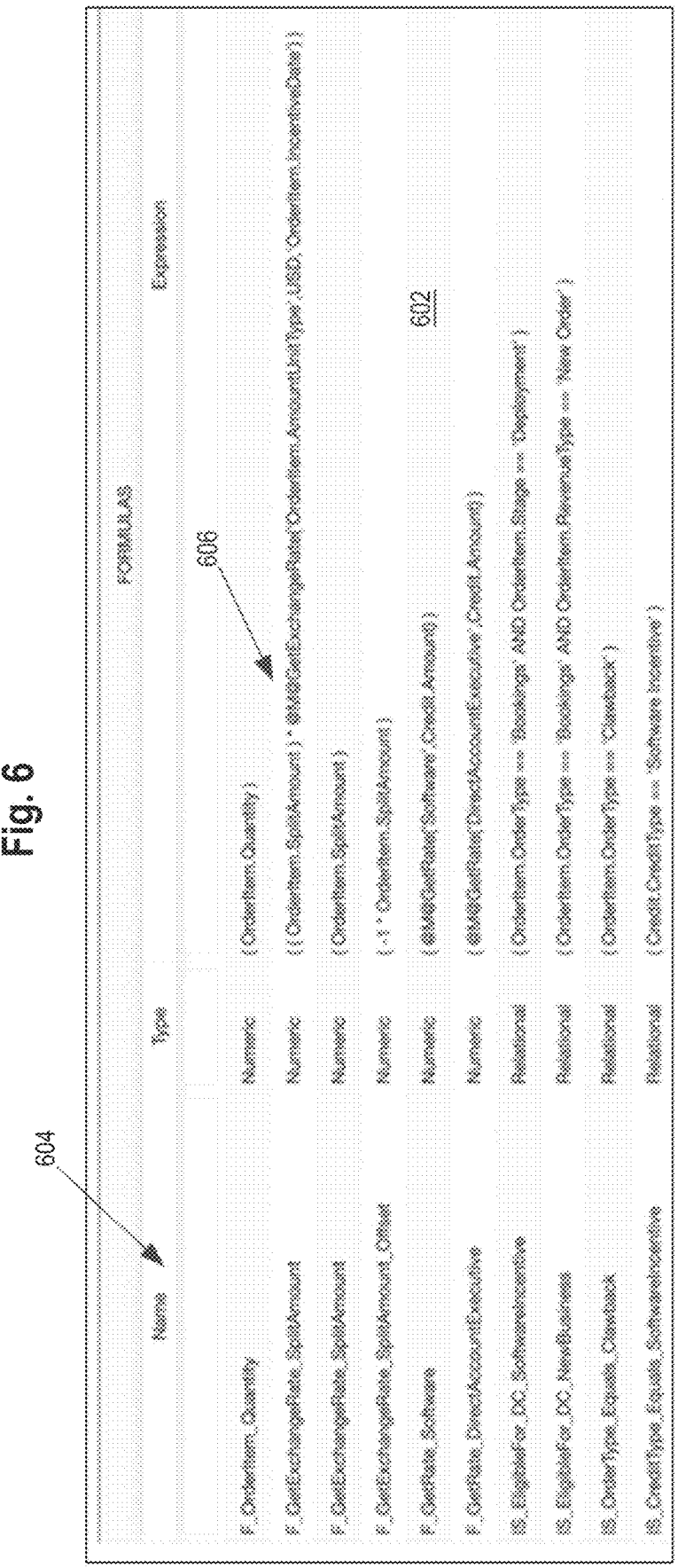
FIG. 6 illustrates example configuration elements for a SaaS instance.

FIG. 6 illustrates example configuration elements for a SaaS instance. In an embodiment, a set of configuration elements 602 comprise formulas organized in a list in which each row represents a discrete calculation formula that an instance of an application program will execute. Each formula 606 is associated with attributes specified in a table header 602 such as name, type, and expression. The syntax of expressions may vary in different application domains and the kinds of expressions shown in FIG. 6 are examples. Furthermore, the specific formulas or rules of FIG. 6 are not required in all domains. Even in the SPM domain, automatic configuration can be applied to other parameters not shown in FIG. 6, such as credit rules, commission rules, plan assignments, and others.

Optionally, test data may be generated based on the input that an entity has provided in answering questions, and the test data can be used to test the rules that have been generated. For example, in parallel with block 243, block 244, and block 250, the process is programmed at block 246 to automatically generate a set of test data based upon the domain objects that were generated at block 242. Further, at block 248, the process is programmed to automatically generate a dataset of expected results. In an embodiment, data engine 112 may be programmed to execute block 246, block 248.

TABLE 7 shows an example of data generation functions that are programmed to receive relevant domain objects and determine output data that should exist in an application instance for purposes of validating an actual configuration resulting from the process of FIG. 2B against expected data. Importantly, the data generation operations consume the same programmatic objects that the SPM engine 108 created based on answers to questions.

TABLE 7

```
class DataBuilder {
    constructor(info) {
        info = JSON.parse(JSON.stringify(info));
        this.projectDetails = info.projectDetails;
        this.customerData = info.projectDetails.CustomerObj;
        this.rules = info.rulesDetails;
        this.dataMapping = objectpath.get(this.projectDetails,
"ConfigDetails.Data.Questions.DataMapping.answer.Response");
        this.hrDataMapping = objectpath.get(this.projectDetails,
"ConfigDetails.Data.Questions.HRDataMapping.answer.Response");
        this.hrData = this.generatehrData( );
        this.directIncentiveRoleMapping = { };
        this.uniqueFieldCombinations = [ ];
        this.batchNames = [ ];
}
generateDate(period, toPeriodFlag) {-
}
generateDefaultValue(incentive, type) {-
}
generateItemCode(incentive, role, period) {-
}
generateOrderCode(incentive, role, period) {-
}
getDefaultRowData(incentive, role, period) {-
}
generatehrData( ) {-
}
generateHierarchy(position, rolesUsed) {-
}
getExampleDataPerPlanPerPeriod(plan, period) {-
}
createQuotaAssignments(titles, hierarchy) {-
}
checkArrayContainsAll(lookFor, lookIn) {-
}
checkArraycontainsSubArray(lookFor, lookIn) {-
}
sortFormulaOrder(a, b) {-
}
updatePersonRecord(formula, title) {-
}
upsertExampleRow(uniqueFieldCombinationsPerFormula,
exampleRow, period, exampleDataPerPlan, incentive, role) {-
}
```

TABLE 7-continued

```
setFieldValue(datatype, Operation, val) {-
}
generateXLSX(data, FileSuffix) {-
}
generateDataZip( ) {-
}
```

The techniques of this disclosure that have been described thus far have been discovered and conceived, by the inventors in an inventive moment, to substantially improve selecting and digitally storing the configuration parameters for a specific entity for onboarding the entity to an application program, especially in complex, multi-tenant SaaS systems. Rather than enter configuration parameters one-by-one in the application program, the present solution uses automatic machine control to present a question flow to a tenant device, receives and stores answer data, and determines what question to ask next based on answer data for a prior question. The sum of answer data, once received, drives the identification of contextually relevant programmatic objects which then can be used to automatically output configuration files for an application program instance, as well as documentation, test data, or validation information. Consequently, manual entry of individual configuration parameters is eliminated in favor of batch uploading of configuration files that have been automatically generated after a machine-controlled question-and-answer session.

Furthermore, a vast reduction is achieved in the total time, CPU cycles, and machine resources such as memory, storage, and network bandwidth, required to execute onboarding of an entity in relation to a complex SaaS application; the former requirement for extensive telephone contact with an entity, individual programming of configuration parameters using hundreds to thousands of network message roundtrips, and the associated use of computing resources from manual approaches are eliminated. Human error is reduced because the machine-executed processes of presenting questions, identification of contextually relevant objects, and generating configuration files all are deterministic.

Past technology has required long interactive discussion sessions involving entity representatives and application representatives, manual completion of data collection forms, or preparation of worksheets, before onboarding can begin. Because the presentation of question data and the collection of answer data is accomplished deterministically by machine, the process is more efficient and less error prone. In some cases, extensive individualized configuration work by professional services representatives of the SaaS application has been required in past approaches; this work is substantially reduced or eliminated using the present techniques.

Thus, the computer-implemented techniques presented in this disclosure provide the practical application of faster, more efficient, more accurate configuration of another computer or application program. Any higher-order concepts that might be represented in the introductory discussion, overviews, or drawing figures are fully integrated into a practical system in which input data is received, other input is automatically requested based on past answers, transformations are applied and output configuration instructions are generated in a manner that is ready for immediate uploading and use. Therefore, the present techniques greatly improve the use of computers to achieve the flexibility and power of modern SaaS applications while eliminating the onboarding process as previously described.

4. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage device. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk or optical disk such as CD-ROM or DVD-ROM and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708 or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices or other audible devices, lamps or LED or LCD indicators, haptic devices, actuators or servos.

At least one input device 714 is coupled to I/O subsystem 702 for communicating signals, data, command selections or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as place the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 722 broadly represents a local area network (LAN), wide-area network (WAN), campus network, internetwork or any combination thereof. Communication interface 718 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer and data storage layer such as a relational database system using structured query language (SQL) or no SQL, an object store, a graph database, a flat file system or other data storage.

Computer system 700 can send messages and receive data and instructions, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage 710, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    using a server computer that is communicatively coupled to an instance of an application program, and under stored program control:
    collecting answer data from a computing device by executing input AI instructions, to programmatically select a plurality of question data representing questions about configuration values of the application program, to cause rendering the question data in a user interface of a display device coupled to the computing device, and to select other question data automatically via a decision tree embodied in the input AI instructions;
    the question data comprising a question flow of digitally stored, structured, language-independent set of declarations, the declarations comprising, for each possible answer to each question, an identifier of a next question, the server computer being programmed to read the declarations and to branch execution to a particular next question based upon the identifier of the next question;
    receiving a plurality of answer data from the computing device in response to the rendering of the question data;
    automatically repeating executing the input AI instructions and receiving the plurality of answer data to obtain a complete set of answer data;
    based on applying pre-defined programmatic rules to the answer data, identifying a plurality of contextually relevant domain objects and storing the domain objects;
    applying one or more programmed transformations to the domain objects to result in automatically generating one or more configuration files for the instance of the application program, the configuration files being formatted for machine parsing at the instance of the application program to cause automatic modification of one or more configuration parameters of the instance of the application program;
    uploading the one or more configuration files to the instance of the application program to cause the modification.

2. The method of claim 1, further comprising, using output engine instructions and a word processor transformation, based on the domain objects, automatically generating one or more requirement and design documents corresponding to the one or more configuration files.

3. The method of claim 1, the automatically generating one or more configuration files being driven by an extensible markup language (XML) transformation that the server computer parses and applies to the domain objects to result in generating the one or more configuration files as XML files.

4. The method of claim 1, the input AI instructions being programmed to read the question flow, to store, in main memory, a decision tree comprising nodes representing question identifiers, answer labels, and next question identifiers for each of the answer labels, and to execute the decision tree using the answer data to result in selecting the next question.

5. The method of claim 4, the question data further comprising declarations of questions and metadata concerning the questions, the metadata including visual rendering instructions, the input AI instructions being programmed to read the question data and to call dynamic user interface instructions with the visual rendering instructions to cause digitally graphically rendering of the question data in a graphical user interface of a display device coupled to the computing device.

6. The method of claim 5, further comprising applying an extensible markup language (XML) transformation to the same domain objects that have been populated to result in generating the one or more configuration files as XML files.

7. The method of claim 1, the pre-defined programmatic rules comprising references to one or more of the answer data or programmatic variables that have been populated with values obtained from the answer data, and the pre-defined programmatic rules declaring as consequences the specific domain objects and attribute values to populate in the domain objects based on one or more of the answer data or programmatic variables.

8. The method of claim 1, the instance of the application program being a particular tenant instance of a multi-tenant application program that is programmed to execute sales performance management (SPM) functions, and further comprising executing the collecting the answer data in association with onboarding a particular tenant to the particular tenant instances of the application program.

9. One or more non-transitory computer-readable storage media storing instructions which, when executed using one or more processors of a server computer that is communicatively coupled to an instance of an application program, cause the one or more processors to execute:
    collecting answer data from a computing device by executing input AI instructions, to programmatically select a plurality of question data representing questions about configuration values of the application program, to cause rendering the question data in a user interface of a display device coupled to the computing device, and to select other question data automatically via a decision tree embodied in the input AI instructions;
    the question data comprising a question flow of digitally stored, structured, language-independent set of declarations, the declarations comprising, for each possible answer to each question, an identifier of a next question, the sequences of instructions being programmed to read the declarations and to branch execution to a particular next question based upon the identifier of the next question;

receiving a plurality of answer data from the computing device in response to the rendering of the question data;

automatically repeating executing the input AI instructions and receiving the plurality of answer data to obtain a complete set of answer data;

based on applying pre-defined programmatic rules to the answer data, identifying a plurality of contextually relevant domain objects and storing the domain objects;

applying one or more programmed transformations to the domain objects to result in automatically generating one or more configuration files for the instance of the application program, the configuration files being formatted for machine parsing at the instance of the application program to cause automatic modification of one or more configuration parameters of the instance of the application program;

uploading the one or more configuration files to the instance of the application program to cause the modification.

10. The computer-readable media of claim 9, further comprising sequences of instructions which when executed using the one or more processors cause the one or more processors to perform, using output engine instructions and a word processor transformation, based on the domain objects, automatically generating one or more requirement and design documents corresponding to the one or more configuration files.

11. The computer-readable media of claim 10, the sequences of instructions for the automatically generating one or more configuration files being driven by an extensible markup language (XML) transformation that the one or more processors parse and interpret to generate the one or more configuration files as XML files.

12. The computer-readable media of claim 9, the input AI instructions being programmed to read the question flow and digitally store, in main memory, a decision tree comprising nodes representing question identifiers, answer labels, and next question identifiers for each of the answer labels.

13. The computer-readable media of claim 12, the question data further comprising declarations of questions and metadata concerning the questions, the metadata including visual rendering instructions, the input AI instructions being programmed to read the question data and to call dynamic user interface instructions with the visual rendering instructions to cause digitally graphically rendering of the question data in a graphical user interface of a display device coupled to the computing device.

14. The computer-readable media of claim 13, further comprising sequences of instructions which when executed cause the one or more processors to perform applying an extensible markup language (XML) transformation to the same domain objects that have been populated to result in generating the one or more configuration files as XML files.

15. The computer-readable media of claim 9, the pre-defined programmatic rules comprising references to one or more of the answer data or programmatic variables that have been populated with values obtained from the answer data, and the pre-defined programmatic rules declaring as consequences the specific domain objects and attribute values to populate in the domain objects based on one or more of the answer data or programmatic variables.

16. The computer-readable media of claim 9, the instance of the application program being a particular tenant instance of a multi-tenant application program that is programmed to execute sales performance management (SPM) functions, and further comprising sequences of instructions which when executed cause the one or more processors to perform executing the collecting the answer data in association with onboarding a particular tenant to the particular tenant instances of the application program.

\* \* \* \* \*